US006908650B2

(12) United States Patent
Odorisio et al.

(10) Patent No.: US 6,908,650 B2
(45) Date of Patent: Jun. 21, 2005

(54) POLYESTER AND POLYAMIDE COMPOSITIONS OF LOW RESIDUAL ALDEHYDE CONTENT

(75) Inventors: Paul A. Odorisio, Leonia, NJ (US); Stephen M Andrews, New Fairfield, CT (US); Dario Lazzari, Bologna (IT); Dirk Simon, Mutterstadt (DE); Roswell E. King, III, Pleasantville, NY (US); Melissa Stamp, Dover, DE (US); Roger Reinicker, Hockessin, DE (US); Michael Tinkl, Grenzach-Wyhlen (DE); Natacha Berthelon, Pfastatt (FR); Daniel Müller, Basel (CH); Urs Hirt, Muttenz (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 216 days.

(21) Appl. No.: 10/202,380

(22) Filed: Jul. 24, 2002

(65) Prior Publication Data

US 2003/0139497 A1 Jul. 24, 2003

Related U.S. Application Data

(63) Continuation-in-part of application No. 10/026,263, filed on Dec. 21, 2001, now abandoned.
(60) Provisional application No. 60/327,943, filed on Oct. 9, 2001, provisional application No. 60/287,927, filed on Apr. 30, 2001, provisional application No. 60/275,026, filed on Mar. 12, 2001, and provisional application No. 60/273,127, filed on Mar. 2, 2001.

(51) Int. Cl.$^7$ .......................... B29D 22/00; C08K 5/17; A23L 1/00
(52) U.S. Cl. ................ 428/35.7; 428/35.9; 428/36.7; 428/36.91; 428/36.92; 426/143; 524/236
(58) Field of Search .................... 428/35.7, 35.9, 428/36.7, 36.91, 36.92; 426/143; 524/236

(56) References Cited

U.S. PATENT DOCUMENTS

| | | | |
|---|---|---|---|
| 3,408,422 A | * 10/1968 | May ........................ 526/220 |
| 4,361,681 A | 11/1982 | Bernhardt .................. 525/444 |
| 4,394,470 A | 7/1983 | Werner et al. ............... 524/56 |
| 4,504,531 A | * 3/1985 | Murata et al. ............. 428/36.6 |
| 4,590,231 A | 5/1986 | Seltzer et al. .............. 524/100 |
| 4,612,393 A | 9/1986 | Ravichandran et al. ..... 564/300 |
| 4,649,221 A | 3/1987 | Ravichandran et al. ..... 564/300 |
| 4,666,962 A | 5/1987 | Ravichandran et al. ....... 524/99 |
| 4,666,963 A | 5/1987 | Ravichandran et al. ..... 524/101 |
| 4,668,721 A | 5/1987 | Seltzer et al. ................ 524/95 |
| 4,678,826 A | 7/1987 | Pastor et al. ............... 524/104 |
| 4,691,015 A | 9/1987 | Behrens et al. ............. 544/198 |
| 4,696,964 A | 9/1987 | Ravichandran ............. 524/236 |
| 4,703,073 A | 10/1987 | Winter et al. ................ 524/99 |
| 4,720,517 A | 1/1988 | Ravichandran et al. ..... 524/101 |
| 4,753,972 A | 6/1988 | Ravichandran ............. 524/131 |
| 4,757,102 A | 7/1988 | Ravichandran et al. ....... 524/95 |
| 4,760,179 A | 7/1988 | Ravichandran ............. 564/157 |
| 4,782,105 A | 11/1988 | Ravichandran et al. ..... 524/236 |
| 4,831,134 A | 5/1989 | Winter et al. ............... 540/524 |
| 4,837,115 A | 6/1989 | Igarashi et al. .......... 428/36.92 |
| 4,873,279 A | 10/1989 | Nelson ....................... 524/384 |
| 4,876,300 A | 10/1989 | Seltzer et al. .............. 524/100 |
| 4,898,901 A | 2/1990 | Ravichandran et al. ..... 524/237 |
| 4,929,657 A | 5/1990 | Ravichandran ............. 524/196 |
| 5,006,577 A | 4/1991 | Behrens et al. ............... 524/95 |
| 5,019,285 A | 5/1991 | Evans et al. ................ 252/47.5 |
| 5,021,479 A | 6/1991 | Ravichandran et al. ....... 524/96 |
| 5,045,583 A | 9/1991 | Odorisio et al. ............ 524/236 |
| 5,057,563 A | 10/1991 | Ravichandran ............... 524/98 |
| 5,064,883 A | 11/1991 | Behrens et al. ............... 524/95 |
| 5,081,300 A | 1/1992 | Odorisio et al. ............ 564/297 |
| 5,162,408 A | 11/1992 | Odorisio et al. ............ 524/236 |
| 5,185,448 A | 2/1993 | Odorisio et al. ............ 546/186 |
| 5,235,056 A | 8/1993 | Cunkle et al. .............. 546/187 |
| 5,258,233 A | 11/1993 | Mills et al. ................. 428/480 |
| 5,266,413 A | 11/1993 | Mills et al. ................. 428/480 |
| 5,340,884 A | 8/1994 | Mills et al. ................. 125/420 |
| 5,459,224 A | 10/1995 | Pruett et al. ................ 528/192 |
| 5,648,032 A | 7/1997 | Nelson et al. .............. 264/101 |
| 5,650,469 A | 7/1997 | Long et al. ................. 525/425 |
| 5,656,221 A | 8/1997 | Schumann et al. ........... 264/85 |
| 5,681,879 A | * 10/1997 | Yamamoto et al. ......... 524/373 |
| 5,844,029 A | 12/1998 | Prabhu et al. .............. 524/236 |
| 5,856,385 A | 1/1999 | Mehrer et al. .............. 524/108 |
| 5,880,191 A | 3/1999 | Prabhu et al. .............. 524/236 |
| 5,922,794 A | 7/1999 | Prabhu et al. .............. 524/236 |
| 6,191,209 B1 | * 2/2001 | Andrews et al. ............ 524/502 |
| 6,790,499 B2 | * 9/2004 | Andrews et al. ......... 428/36.92 |

FOREIGN PATENT DOCUMENTS

| | | |
|---|---|---|
| EP | 0191701 | 8/1986 |
| EP | 0714832 | 6/1996 |
| EP | 0826713 | 3/1998 |
| JP | 62257959 | 11/1987 |
| WO | 93/20147 | 10/1993 |
| WO | 93/23474 | 11/1993 |
| WO | 98/07786 | 2/1998 |
| WO | 98/39388 | 9/1998 |
| WO | 00/66659 | 11/2000 |
| WO | 01/00724 | 1/2001 |
| WO | 01/83617 | 11/2001 |

OTHER PUBLICATIONS

English Abstract for JP 62–257959 (1987).

\* cited by examiner

*Primary Examiner*—Tae H. Yoon
(74) *Attorney, Agent, or Firm*—Tyler A. Stevenson

(57) ABSTRACT

A mixture of a polyester, such as poly(ethylene terephthalate) PET, or a polyamide, and a suitable stabilizer selected from the group consisting of hydroxylamine stabilizers, substituted hydroxylamine stabilizers, nitrone stabilizers and amine oxide stabilizers, when extrusion compounded exhibits a lower residual acetaldehyde content than does polyester or polyamide alone when similarly treated. The invention pertains to any polyester or polyamide used in the manufacture of molded articles, fibers or films, for instance bottles or containers which are used to store consumer materials, for example food, beverages and water.

13 Claims, No Drawings

POLYESTER AND POLYAMIDE COMPOSITIONS OF LOW RESIDUAL ALDEHYDE CONTENT

This application is a continuation-in-part of application Ser. No. 10/026,263, filed Dec. 21, 2001, abandoned, which application claims the benefit under 35 USC 119(e) of U.S. Provisional Application Nos. 60/273,127, filed Mar. 2, 2001, 60/275,026 filed Mar. 12, 2001, 60/287,927, filed Apr. 30, 2001 and 60/327,943, filed Oct. 9, 2001.

A mixture of a polyester, such as poly(ethylene terephthalate) PET, or a polyamide, and a suitable compound selected from the group consisting of the hydroxylamine, substituted hydroxylamine, nitrone and amine oxide stabilizers, when extrusion compounded exhibits a lower residual aldehyde content than does polyester or polyamide alone when similarly treated. The invention pertains to any polyester or polyamide used in the manufacture of fibers, films or molded articles. For instance bottles or containers which are used to store consumer materials, for example food, beverages and water.

BACKGROUND OF THE INVENTION

Acetaldehyde is known as a decomposition product of polyesters such as PET. The acetaldehyde imparts an undesirable taste or flavor to bottled water stored in PET bottles. It has been a long sought objective of the industry to reduce the level of acetaldehyde which migrates out of the PET bottle walls into the water or other beverage stored therein. A number of engineering or design changes to extruders, injection molding machines for preforms and bottle making machinery have been made to minimize formation of acetaldehyde when poly(ethylene terephthalate) PET is processed. Modification to the PET composition itself have been made to lower its melting point or its melt viscosity in order to allow less severe thermal or mechanical damage when PET is processed into preforms or bottles.

Aldehydes may be formed in polyamides, for instance polyamide 6 and polyamide 6,6, under conditions of thermal stress. These aldehydes initiate a chain of events that lead to unwanted yellowing and a reduction in mechanical properties.

U.S. Pat. No. 4,361,681 teaches that polyester containing anhydride end-cap agents have a reduced acetaldehyde generation rate.

U.S. Pat. No. 5,459,224 discloses polyesters having 4-oxybenzylidene end-cap agents to impart improved weatherability and photostability, but no mention is made as to evolution of acetaldehyde. However, it is indicated that such polyesters are suitable for food and beverage packaging.

Polyesters can be synthesized by a number of routes known in the art using a variety of catalyst systems. EP 826,713 A1 teaches that lower levels of acetaldehyde occur during copolymerization of PET when a phosphite such as bis(2,4-di-tert-butylphenyl)pentaerythritol phosphite is present during the polymerization.

U.S. Pat. Nos. 4,837,115; 5,258,233; 5,266,413; 5,340,884; 5,648,032 and 5,650,469; and WO 93/20147 A1; WO 93/23474 A1; WO 98/07786 and WO 98/39388 teach the use of polyamides as a means of reducing the concentration of acetaldehyde, presumably via a Schiff-base reaction with the aldehyde, which is reversible in the presence of water.

EP application 191,701A2 describes biaxially oriented containers having excellent barrier properties said container comprising a blend of a poly(ethylene terephthalate) resin and an ethylene-vinyl alcohol copolymer resin. This reference is focused on improved gas barrier properties and is silent as to any reduction of acetaldehyde content.

Japanese Sho 62-257959 describes biaxially stretched vessels built of synthetic resin consisting of poly(ethylene terephthalate) blended with a copolymer of a polyamide, or blended with ethylene-vinyl alcohol at a weight fraction of 0.1 to 15 percent. The examples are limited to a single EVOH polymer (EVEL G110, Kuraray Co.). It is taught that a lower level of acetaldehyde occurs when the EVOH polymer is present.

European application 714,832A1 teaches a method of manufacturing a container comprising poly(ethylene terephthalate), polycarbonate or PEN polyester with an additive in the bottle wall which binds acetaldehyde. The additive is generally described as a polyamide.

U.S. Pat. No. 5,656,221 describes a process of producing polyester with reduced acetaldehyde concentration using certain catalysts or inert gas conditions or by adding an amide compound. These include commercial polyamides or long chain aliphatic amide compounds.

U.S. Pat. No. 5,856,385 teaches the use of polyamide or amide-wax to reduce the level of acetaldehyde which occurs when sorbitol-based clarifying agent is heated in polyolefins.

Copending application Ser. Nos. 09/603,505 and 09/603,506 disclose the use of poly(vinyl alcohol) or an ethylene/vinyl alcohol copolymer and polyhydric alcohols, respectively, towards reducing the residual aldehyde content in PET. Copending application Ser. No. 09/666,679 discloses the use of polyacrylamide, polymethacrylamide or an acrylamide or methacrylamide copolymer with at least one ethylenically unsaturated comonomer towards reducing the residual aldehyde content in PET.

U.S. Pat. No. 4,873,279 discloses a composition comprising a copolyester-carbonate resin, a polyester resin, and a minor amount of a mixture of a polyol and at least one epoxide.

U.S. Pat. No. 4,394,470 discloses a polyethylene terephthalate molding composition with a caramel colorant. The caramel colorant may have been formed in situ from a mono- or disaccharide.

U.S. Pat. No. 5,681,879 discloses a flame-retardant polyester composition comprising a polyester resin, a polyhydric alcohol having not less than 3 hydroxyl groups, an inorganic flame retardant and a halogen-based flame retardant.

WO 00/66659 discloses molding compositions comprising PET and polyhydric alcohol additives for the reduction of acetaldehyde formation.

WO 01/00724 discloses the use of polyols towards reducing acetaldehyde formation in extruded products of PET.

Hydroxylamine derivatives, such as N,N,-dialkylhydroxylamines and N,N-dibenzylhydroxylamine, are well known as useful stabilizers for a variety of polymeric substrates as is taught for example in U.S. Pat. Nos. 4,590,231, 4,668,721, 4,782,105 and 4,876,300, the relevant parts of which are incorporated herein by reference.

U.S. Pat. Nos. 4,649,221, 4,691,015 and 4,703,073 teach the use of polyhydroxylamine compounds, hydroxylamines derived from hindered amines and alkylated N,N-dibenzylhydroxylamine derivatives, respectively, towards stabilizing polyolefins. All three patents teach that the polyolefin compositions are stabilized against degradation and/or discoloration upon exposure to heating at elevated temperatures, to the combustion products of natural gas, to gamma irradiation or to prolonged storage at ambient temperature.

U.S. Pat. Nos. 4,612,393, 4,696,964, 4,720,517 and 4,757,102 disclose the use of various hydroxylamine compounds towards the stabilization of organic materials.

Hydroxylamine stabilizers are also disclosed in U.S. Pat. Nos. 4,831,134, 5,006,577, 5,019,285, 5,064,883, 5,185,448 and 5,235,056.

U.S. Pat. Nos. 4,666,962, 4,666,963, 4,678,826, 4,753,972, 4,757,102, 4,760,179, 4,929,657, 5,057,563, 5,021,479, 5,045,583 and 5,185,448 disclose the use of various substituted hydroxylamine stabilizers towards the stabilization of organic materials.

U.S. Pat. Nos. 5,081,300, 5,162,408, 5,844,029, 5,880,191 and 5,922,794 disclose the use of saturated hydrocarbon amine oxides towards the stabilization of thermoplastic resins.

U.S. Pat. No. 4,898,901 discloses the use of long chain nitrone compounds as process stabilizers for polyolefin compositions.

Despite the efforts towards a solution for reducing aldehydic contaminates in PET water bottles, for example, there still remains a need for more effective solutions.

The instant invention is useful for any polyester or polyamide where aldehydic compounds, for example acetaldehyde, are formed or evolved during thermal processing of said polyester or polyamide. Thermal processing of said polyester or polyamide includes the synthesis thereof, thermal exposure during solid state polymerization (SSP), any injection molding, injection-blow molding or stretch-blow molding used in the manufacture of preforms, parissons, or bottles and containers, or extrusion of film, or during any melt processing of polyester or polyamide above its glass transition temperature and below its decomposition temperature.

The instant invention provides for a lower amount of contaminants (i.e. aldehydes) in PET water bottles thus providing for improved taste or flavor in bottled water or other bottled beverages in said PET containers. The reduction in the amount of acetaldehyde is highly beneficial in this respect.

Further, the compositions of the present invention impart no unacceptable color or haze to PET bottles. "Haze" is an undesirable, perceptible graying effect.

DETAILED DISCLOSURE

The instant invention pertains to a composition, stabilized against the formation of aldehydic contaminants during melt processing of said composition, which comprises
(a) a polyester or polyamide, and
(b) an effective stabilizing amount of at least one compound selected from the group consisting of
   i.) hydroxylamine stabilizers,
   ii.) substituted hydroxylamine stabilizers,
   iii.) nitrone stabilizers, and
   iv.) amine oxide stabilizers.

The polyester or polyamide of component (a) is 95–99.99% by weight and the stabilizer or stabilizers of component (b), in total, are 5 to 0.01% by weight, based on the total weight of (a) and (b).

For instance, component (a) is 98–99.99% by weight and component (b) is 2 to 0.01% by weight of the total of (a) and (b); for example component (a) is 99 to 99.97% by weight and component (b) is 1 to 0.03% by weight, based on the total weight of (a) and (b).

The additives of component (b) may be added to the polyester or polyamide of component (a) by known techniques. For example, the additives of component (b) may be added neat or as a solution or dispersion, with or without subsequent evaporation of the solvent. Component (b) may also be added to the polyester or polyamide to be stabilized in the form of a masterbatch which contains component (b) in a concentration of, for example, about 2.5% to about 25% by weight.

The polyester of component (a) has dicarboxylic acid repeat units selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

For instance such diacids are terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, maleic acid, glutaric acid, adipic acid, sebacic acid and mixtures thereof.

For example diacids are terephthalic acid, isophthalic acid and 2,6-naphthalene dicarboxylic acid.

The diol or glycol portion of the polyester of component (a) are derived from the generic formula HO—R—OH where R is an aliphatic, cycloaliphatic or aromatic moiety of 2 to 18 carbon atoms.

For example such diols or glycols are ethylene glycol, diethylene glycol, triethylene glycol, propane-1,3-diol, propane-1,2-diol, butane-1,4-diol, pentane-1,5-diol, hexane-1,6-diol, 1,4-cyclohexanedimethanol, 3-methylpentane-2,4-diol, 2-methylpentane1,4-diol, 2,2-diethyl-propane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl) propane, 2,2-bis-(4-hydroxypropoxyphenyl)ethane and mixtures thereof.

The diol is for example ethylene glycol or 1,4-cyclohexanedimethanol.

The polyester of component (a) is for example poly (ethylene terephthalate) PET or poly(ethylene 2,6-naphthalene-2,6-dicarboxylate); or instance poly(ethylene terephthalate).

It is also contemplated that the polyester of component (a) can also be a blend of polyesters or copolyesters including components mentioned above.

The polyamides of the present invention are for instance those prepared by the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. The term "substantially equimolar" proportions includes both strictly equimolar proportions and slight departures therefrom which are involved in conventional techniques for stabilizing the viscosity of the resultant polyamides. The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring containing the —CO—NH— group in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine, trimethylhexamethylenediamine, m-phenylenediamine and m-xylylenediamine.

The dicarboxylic acids may be represented by the formula

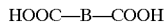

wherein

B is a divalent aliphatic or aromatic group containing at least 2 carbon atoms. Examples of aliphatic acids are sebacic acid, octadecanedioic acid, suberic acid, glutaric acid, pimelic acid and adipic acid.

Both crystalline and amorphous polyamides may be employed, with the crystalline species known for their solvent resistance. Typical examples of the polyamides or nylons, as these are often called, include, for example, polyamide-6 (polycaprolactam), 6,6 (polyhexamethylene adipamide), 11, 12, 4, 6, 10 and 6, 12 as well as polyamides from terephthalic acid and/or isophthalic acid and trimethylhexamethylenediamine; from adipic acid and m-xylylenediamines; from adipic acid, azelaic acid and 2,2-bis(p-aminophenyl)propane or 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Polyamides of the present invention are for instance polyamide-6; 4; 6; 6,6; 6,4; 6,9; 6,10; 6,12; 11 and 12. For example, the polyamide of the present invention is polyamide-4, polyamide-6, polyamide-6,6, polamide-12 or polyamide-6,4.

The polyamides of the present invention may also include known polyamide stabilizers, for example Irgafos® 168, Irganox® 1098, Nylostab® S-EED (Clariant, CAS# 42774-15-2) and Polyad® 201 (CuI/Kl/Zn stearate; 10%/80%/10% ratio w/w). Irganox® 1098 (Ciba) is N,N'-bis(3,5-di-tert-butyl-4-hydroxyphenylpropionyl)hexamethylenediamide. The polyamide stabilizers are employed at their known levels, for example from about 0.01 to about 1% by weight, based on polyamide.

The polyamide compositions of the present invention exhibit improved resistance to yellowing and improved mechanical properties.

It is contemplated that the polymer of component (a) can be virgin polymer or alternatively polymer recyclate. Additionally, it is possible to add the stabilizer or stabilizers described for component (b) as part of a concentrate with a polyester or a polyamide carrier resin.

The novel compositions provided by this invention are useful in the manufacture of containers or packages for comestibles such as beverages and food. Articles molded from these polyesters or polyamides exhibit good thin-wall rigidity, excellent clarity and good barrier properties with respect to moisture and atmospheric gases, particularly carbon dioxide and oxygen.

The plastic containers and films of the present invention are rigid or flexible mono- and/or multi-layered constructions. Typical multi-layer constructions have two or more layer laminates, manufactured either by thermoforming, or extrusion of multi-layer flexible films, or extrusion of bottle "preforms" or "parissons" followed by subsequent blow molding of the preforms into bottles. In a multi-layer system, layers of any suitable plastic may be employed.

Multi-layered containers and films of this invention may for example, be formed from layers of polyesters, polyamides, polyolefins, polyolefin copolymers such as ethylene-vinyl acetate, polystyrene, poly(vinyl chloride), poly(vinylidene chloride), polyamides, cellulosics, polycarbonates, ethylene-vinyl alcohol, poly(vinyl alcohol), styrene-acrylonitrile and ionomers, with the proviso that at least one layer comprises a polyester or polyamide composition of the present invention.

For both films and rigid packaging (bottles), typically the exterior layer, and innermost layer contacting the contents, are composed, for example, of polyesters such as PET or PEN [poly(ethylene naphthalate)], polypropylene, or polyethylene such as HDPE. The middle layers, often called 'barrier' or 'adhesive' or 'tie' layers, are composed of one or more combinations of either PET, PEN, carboxylated polyethylene ionomer such as Surlyn®, vinyl alcohol homopolymers or copolymers such as poly(vinyl alcohol), partially hydrolyzed poly(vinyl acetate), poly(ethylene-co-vinyl alcohol) such as EVOH or EVAL, nylons or polyamides such as Selar® (DuPont) or polyamides based on metaxylenediamine (sometimes called nylon MXD-6), or polyvinylidene chloride (PVDC), or polyurethanes.

Accordingly, the present invention also pertains to a mono- or multi-layered plastic container or film, stabilized against the formation of aldehydic contaminants during melt processing of said container or film, comprising at least one layer which comprises (a) a polyester or polyamide, and
(b) an effective stabilizing amount of at least one compound selected from the group consisting of
  i.) hydroxylamine stabilizers,
  ii.) substituted hydroxylamine stabilizers
  iii.) nitrone stabilizers, and
  iv.) amine oxide stabilizers.

Rigid containers may be manufactured by known mechanical processes:

a) Single-stage blow molding such as performed on Nissei, Aoki, or Uniloy machines,
b) Two-stage, injection molding of pre-forms such as on Netstal or Husky machines, and pre-forms converted to bottles by blow molding (e.g., on Sidel, Corpoplast and Krones machines),
c) Integrated blow molding of pre-forms to bottles, such as processes conducted on Sipa, Krupp Kautex, or Husky ISB machines, and
d) Stretch blow molding (SBM) of pre-forms to bottles.

The pre-forms may be mono-layer or multi-layer in construction. The bottles may optionally be post-treated to alter the inner wall properties. Bottles may optionally be surface treated on the exterior such as by application of surface coatings. UV absorbers and other known stabilizers may be present in such added surface coatings.

By the use of known heat-setting techniques, certain of the polyesters are, in terms of color, I.V. and heat distortion, stable at temperatures up to about 100° C. Such stability characteristics are referred to herein as "hot-fill" stability. The linear polyesters most employed in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly (ethylene 2,6-naphthalenedicarboxylate), wherein the polyesters have been sufficiently heat set and oriented by methods well known in the art to give a desired degree of crystallinity.

The polyester or polyamide fibers of the present invention are prepared by known techniques. They may be woven or nonwoven. The are prepared by melt extrusion processes to form fibers or filaments. In accordance with known technology such as continuous filament spinning for yarn or staple fiber, and nonwoven processes such as spunbond production and meltblown production, the fibers or filaments are formed by extrusion of the molten polymer through small orifices. In general, the fibers or filaments thus formed are then drawn or elongated. In nonwoven processes such as spunbonding and meltblowing, the fibers or filaments are directly deposited onto a foraminous surface, such as a moving flat conveyor and are at least partially consolidated by any of a variety of means including, but not limited to, thermal, mechanical or chemical methods of bonding. It is known to those skilled in the art to combine processes or the fabrics from different processes to produce composite fabrics which possess certain desirable characteristics. Examples of this are combining spunbond and meltblown to produce a laminate fabric that is best known as SMS, meant to represent two outer layers of spunbond fabric and an inner layer of meltblown fabric. Additionally either or both of these processes may be combined in any arrangement with a staple fiber carding process or bonded fabrics resulting from a nonwoven staple fiber carding process. In such described laminate fabrics, the layers are generally at least partially consolidated by one of the means listed above.

In laminate fabrics of the present invention, at least one layer comprises a composition of the present invention.

Fibers of the present invention are for example described in U.S. Pat. Nos. 5,650,509, 5,911,902, 6,294,254, 5,049,447, 5,512,340, 6,010,789, 5,589,530 and 6,020,421, the relevant disclosures of which are hereby incorporated by reference.

Fibers of the present invention may be employed for example in upholstery, clothing, garments, ropes, nets, tire cords, kites, parachutes and the like.

Molded polyamide articles are for example employed in automotive applications (under the hood), and the like.

Polyester films are well known in the art. PET films are employed for packaging for example for medical, food, industrial and decorative products. They are used as business graphics films in labels, printing base, office graphics and signs. They are used as industrial films for example in liners, as carrier, tape backing, protective overlay, membrane switch and for laminating. They are used for example as imaging films in medial and proofing applications and as solar control and security window films. They are used for example in white coated film, white voided film, dimensionally stable film, extrusion coated film, tear resistant film, polarizing film, reflective film, dispensable film, coated film, co-extruded film, insulation film, weather resistant film, laminating film and mirror film.

PEN films are used for example in labels, flexible printed circuitry and electrical insulation.

The polyester films of this invention may be used for example, in combination with other films such as polyolefin films.

Polyamide films, for example PA 6 and PA 6,6 films, are used for example in co-extruded films for packaging. For example, polyamide films are employed in microwaveable food packaging.

The instant invention also pertains to a process for preventing the formation of aldehydic contaminants during melt processing of a polyester or polyamide which comprises incorporating into said polyester or polyamide an effective stabilizing amount of at least one compound selected from the group consisting of i.) hydroxylamine stabilizers, ii.) substituted hydroxylamine stabilizers, iii.) nitrone stabilizers, and iv.) amine oxide stabilizers.

Hydroxylamine stabilizers of component i.) are for example those disclosed in U.S. Pat. Nos. 4,590,231, 4,612,393, 4,649,221, 4,668,721, 4,691,015, 4,696,964, 4,703,073, 4,720,517 4,757,102, 4,782,105, 4,831,134, 4,876,300, 5,006,577, 5,019,285, 5,064,883, 5,185,448 and 5,235,056, the relevant parts of which are incorporated herein by reference.

The hydroxylamine stabilizers of component i.) employed in the novel compositions and methods are for example of the formula (I)

(I)

wherein $T_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms; and $T_2$ is hydrogen, or independently has the same meaning as $T_1$.

Alternatively, the hydroxylamine stabilizers of component i.) of the present invention are compounds that contain one or more of the groups of the formula (II)

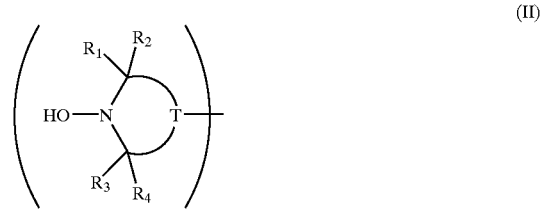

(II)

wherein

T is a group forming a five- or six-membered ring; and $R_1$, $R_2$, $R_3$ and $R_4$ are independently hydrogen, alkyl of 1 to 4 carbon atoms or phenyl.

In the present invention the compounds of component i.) are, for example, N,N-dihydrocarbylhydroxylamines of formula (I) wherein $T_1$ and $T_2$ are independently benzyl, methyl, ethyl, octyl, lauryl, dodecyl, tetradecyl, hexadecyl, heptadecyl or octadecyl, or wherein $T_1$ and $T_2$ are each the alkyl mixture found in hydrogenated tallow amine.

The compounds of component i.) in the present compositions and methods are, for example, N,N-dihydrocarbylhydroxylamines selected from the group consisting of N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine and N,N-di(hydrogenated tallow)hydroxylamine.

Component i.) in the present invention may be for example the N,N-di(alkyl)hydroxylamine produced by the direct oxidation of N,N-di(hydrogenated tallow)amine (Irgastab® FS-042, Ciba Specialty Chemicals Corp.).

The substituted hydroxylamine stabilizers of component ii.) are for example those described in U.S. Pat. Nos. 4,666,962, 4,666,963, 4,678,826, 4,753,972, 4,757,102, 4,760,179, 4,929,657, 5,057,563, 5,021,479, 5,045,583 and 5,185,448 the disclosures of which are hereby incorporated by reference. Component ii.) includes the Michael addition products from the reaction of the hydroxylamines of component i.) with any α,β-unsaturated ketone, ester, amide, or phosphonate. Component ii.) also includes Mannich-type condensation products from the reaction of the hydroxylamines of component i.) with formaldehyde and secondary amines. Component ii.) also includes O-alkenyl substituted analogues of the present hydroxylamines of component i.) as disclosed in U.S. Pat. No. 5,045,583. Component ii.) also includes non-hindered substituted hydroxylamine stabilizers as disclosed in U.S. Pat. No. 5,185,448. Component ii.) also includes acyl derivatives of the hydroxylamine stabilizers of component i.), for example such as those disclosed in U.S. Pat. No. 5,021,479.

The substituted hydroxylamines of component ii.) may be derivatives of the above-described hydroxylamines of formulae (I) and (II), provided that if they are derivatives of hydroxylamines of formula (II), that they are limited to derivatives of hydroxylamines as described in U.S. Pat. Nos. 5,185,448 and 5,235,056.

The present substituted hydroxylamines may be for example of the formula (III) or (IV)

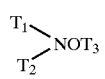

(III)

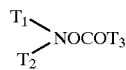

(IV)

wherein $T_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms;

$T_2$ is hydrogen, or independently has the same meaning as $T_1$; and $T_3$ is allyl, straight or branched chain alkyl of 1 to 36 carbon atoms, cycloalkyl of 5 to 18 carbon atoms, cycloalkenyl of 5 to 18 carbon atoms or a straight or branched chain alkyl of 1 to 4 carbon atoms substituted by phenyl or by phenyl substituted by one or two alkyl groups of 1 to 4 carbon atoms or by 1 or 2 halogen atoms.

The substituted hydroxylamines of component ii.) may be for example O-allyl-N,N-dioctadecylhydroxylamine or O-n-propyl-N,N-dioctadecylhydroxylamine or N,N-di(hydrogenated tallow)acetoxyamine.

The nitrones of component iii.) may be for example as described in U.S. Pat. No. 4,898,901, which is hereby incorporated by reference.

The nitrones of component iii.) are for example of the formula (V)

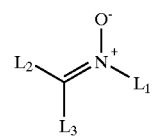

(V)

wherein $L_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms;

$L_2$ and $L_3$ are independently hydrogen, straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms;

or $L_1$ and $L_2$ together form a five- or six-membered ring including the nitrogen atom.

The nitrones of component iii.) may be the corresponding oxidation products of the hydroxylamines of component i.). That is to say, the nitrones of component iii.) may be nitrone analogues of the hydroxylamines of component i.). The nitrones may be for example, N-benzyl-α-phenylnitrone, N-ethyl-α-methylnitrone, N-octyl-α-heptylnitrone, N-lauryl-α-undecylnitrone, N-tetradecyl-α-tridcyinitrone, N-hexadecyl-α-pentadecylnitrone, N-octadecyl-α-heptadecylnitrone, N-hexadecyl-α-heptadecylnitrone, N-ocatadecyl-α-pentadecyinitrone, N-heptadecyl-α-heptadecylnitrone, N-octadecyl-α-hexadecyinitrone, N-methyl-α-heptadecylnitrone and the nitrone derived from N,N-di(hydrogenated tallow)hydroxylamine.

The amine oxide stabilizers of component iv.) are for example those disclosed in U.S. Pat. Nos. 5,081,300, 5,162,408, 5,844,029, 5,880,191 and 5,922,794, the relevant parts of each incorporated herein by reference.

The amine oxide stabilizers of component iv.) are for example saturated tertiary amine oxides as represented by general formula (VI):

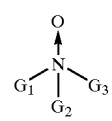

(VI)

wherein $G_1$ and $G_2$ are independently a straight or branched chain alkyl of 6 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms;

$G_3$ is a straight or branched chain alkyl of 1 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms; with the proviso that at least one of $G_1$, $G_2$ and $G_3$ contains a β carbon-hydrogen bond; and wherein said aryl groups may be substituted by one to three halogen, alkyl of 1 to 8 carbon atoms, alkoxy of 1 to 8 carbon atoms or combinations thereof; and wherein said alkyl, aralkyl, alkaryl, cycloalkyl, alkcycloalkyl and cycloalkylalkyl groups may be interrupted by one to sixteen —O—, —S—, —SO—, —SO$_2$—, —COO—, —OCO—, —CO—, —NG$_4$—, —CONG$_4$— and —NG$_4$CO— groups, or wherein said alkyl, aralkyl, alkaryl, cycloalkyl, alkcycloalkyl and cycloalkylalkyl groups may be substituted by one to sixteen groups selected from —OG$_4$, —SG$_4$, —COOG$_4$, —OCOG$_4$, —COG$_4$, —N(G$_4$)$_2$, —CON(G$_4$)$_2$, —NG$_4$COG$_4$ and 5- and 6-membered rings containing the —C(CH$_3$)(CH$_2$R$_x$)NL(CH$_2$R$_x$)(CH$_3$)C— group or wherein said alkyl, aralkyl, alkaryl, cycloalkyl, alkcycloalkyl and cycloalkylalkyl groups are both interrupted and substituted by the groups mentioned above; and wherein G$_4$ is independently hydrogen or alkyl of 1 to 8 carbon atoms;

R$_x$ is hydrogen or methyl;

L is hydrogen, hydroxy, C$_{1-30}$ straight or branched chain alkyl moiety, a —C(O)R moiety where R is a C$_{1-30}$ straight or branched chain alkyl group, or a —OR$_y$ moiety; and R$_y$ is C$_{1-30}$ straight or branched chain alkyl, C$_2$–C$_{30}$ alkenyl, C$_2$–C$_{30}$ alkynyl, C$_5$–C$_{12}$ cycloalkyl, C$_6$–C$_{10}$ bicycloalkyl, C$_5$–C$_8$ cycloalkenyl, C$_6$–C$_{10}$ aryl, C$_7$–C$_9$ aralkyl, C$_7$–C$_9$ aralkyl substituted by alkyl or aryl, or —CO(D), where D is C$_1$–C$_{18}$ alkyl, C$_1$–C$_{18}$ alkoxy, phenyl, phenyl substituted by hydroxy, alkyl or alkoxy, or amino or amino mono- or di-substituted by alkyl or phenyl.

Examples of structures of formula (VI) are where G$_1$ and G$_2$ are independently benzyl or substituted benzyl. It is also possible for each of G$_1$, G$_2$, and G$_3$ to be the same residue. G$_1$ and G$_2$ may also independently be alkyl groups of 8 to 26 carbon atoms, for example alkyl groups of 10 to 26 carbon atoms. G$_3$ may be an alkyl group of 1 to 22 carbon atoms, for example methyl or substituted methyl. Also, the present amine oxides include those wherein G$_1$, G$_2$, and G$_3$ are the same alkyl groups of 6 to 36 carbon atoms. The aforementioned residues for G$_1$, G$_2$, and G$_3$ are, for instance, saturated hydrocarbon residues or saturated hydrocarbon residues containing at least one of the aforementioned —O—, —S—, —SO—, —CO$_2$—, —CO—, or —CON— moieties. Those skilled in the art will be able to envision other useful residues for each of G$_1$, G$_2$, and G$_3$ without detracting from the present invention.

The saturated amine oxides of component iv.) may also includes poly(amine oxides). By poly(amine oxides) is meant tertiary amine oxides containing at least two tertiary amine oxides per molecule. Illustrative poly(amine oxides), also called "poly(tertiary amine oxides)", include the tertiary amine oxide analogues of aliphatic and alicyclic diamines such as, for example, 1,4-diaminobutane; 1,6-diaminohexane; 1,10-diaminodecane; and 1,4-diaminocyclohexane, and aromatic based diamines such as, for example, diamino anthraquinones and diaminoanisoles.

Also included as component iv.) are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. All of the aforementioned amine oxides may optionally contain at least one —O—, —S—, —SO—, —CO$_2$—, —CO—, or —CONG$_4$— moiety. For instance, each tertiary amine oxide of the polymeric tertiary amine oxide may contain a C$_1$ residue.

The groups G$_1$, G$_2$ and G$_3$ of formula (VI) may be attached to a molecule containing a hindered amine. Hindered amines are known in the art and the amine oxide of the present invention may be attached to the hindered amine in any manner and structural position of the hindered amine. Useful hindered amines when part of a compound of component iv.) include those of the general formulas (VII) and (VIII):

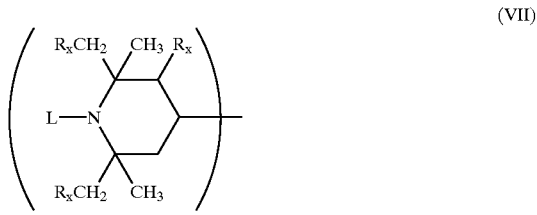

(VII)

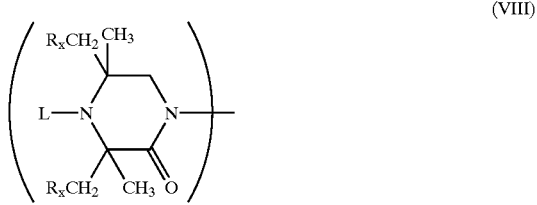

(VIII)

wherein L and R$_x$ are as described above. Also included are amine oxides containing more than one hindered amine and more than one saturated amine oxide per molecule. The hindered amine may be attached to a poly(tertiary amine oxide) or attached to a polymeric substrate, as discussed above.

Specific examples of component (b) are one or more compounds selected from i.) an N,N-di(alkyl)hydroxylamine produced by the direct oxidation of N,N-di(hydrogenated tallow)amine (Irgastab® FS-042), ii.) O-allyl-N,N-dioctadecylhydroxylamine, iii.) N-octadecyl-α-heptadecylnitrone, and iv.) Genox™ EP, a di(C$_{16}$–C$_{18}$)alkyl methyl amine oxide, CAS#204933-93-7.

Irgastab® FS-042 is available from Ciba Specialty Chemicals. Genox™ EP is available from GE Chemicals. O-allyl-N,N-dioctadecylhydroxylamine is as prepared in Example 3 of U.S. Pat. No. 5,045,583. N-octadecyl-α-heptadecylnitrone is as prepared in Example 3 of U.S. Pat. No. 4,898,901.

The instant invention also pertains to a process for forming a bottle preform or a bottle or container suitable for storing water (mineral, natural, ozonated) or other foodstuffs, which allows the desirable taste of the water or foodstuff after packaging to remain unaltered after being placed in said bottle or container prepared from the polyester or polyamide composition of the instant invention.

The instant plastic container or film stabilized by a compound or compounds of component (b) may also optionally have incorporated therein or applied thereto from about 0.01 to about 10% by weight; for instance from about 0.025 to about 5% by weight, for example from about 0.1 to about 3% by weight, based on the total weight of the composition, of additional coadditives such as antioxidants, other UV absorbers, hindered amines, phosphites or phosphonites, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents, blowing agents and the like, such as the materials listed below, or mixtures thereof.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl-4-hydroxy-5-methyl-phenyl) dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. Benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl) sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl) isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1 supplied by Uniroyal).

1.18. Ascorbic Acid (Vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl -p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl] amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV Absorbers and Light Stabilizers 2.1. 2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189, 615; 3,218,332; 3,230,194; 4,127,586; 4,226,763; 4,275, 004; 4,278,589; 4,315,848; 4,347,180; 4,383,863; 4,675, 352; 4,681,905, 4,853,471; 5,268,450; 5,278,314; 5,280, 124; 5,319,091; 5,410,071; 5,436,349; 5,516,914; 5,554, 760; 5,563,242; 5,574,166; 5,607,987 and 5,977,219, such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl) phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl) phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3, 5-di-tert-butyl-4-hydroxybenzoate.

2.4. Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS# 7443-25-6), and Sanduvor® PR31, di-(1,2,2,6,6-pentamethylpiperidin-4-yl) p-methoxybenzylidene-malonate (CAS #147783-69-5).

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amine stabilizers, for example 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-amino-propylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethane, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described in U.S. Pat. No. 5,980,783, the relevant parts of which are hereby incorporated by reference, that is compounds of component I-a), I-b), I-c), I-d), I-e), I-f), I-g), I-h), I-i), I-j), I-k) or I-l), in particular the light stabilizer 1-a-1, 1-a-2, 1-b-1, 1-c-1, 1-c-2, 1-d-1, 1-d-2, 1-d-3, 1-e-1, 1-f-1, 1-g-1, 1-g-2 or 1-k-1 listed on columns 64–72 of said U.S. Pat. No. 5,980,783.

The sterically hindered amine may also be one of the compounds described in EP 782994, for example compounds as described in claims 10 or 38 or in Examples 1–12 or D-1 to D-5 therein.

2.7. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl)sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl) succinate, bis(1-(2-hydroxy-2-methylpropoxy)-2,2,6,6-tetramethylpiperidin-4-yl)glutarate and 2,4-bis{N-[1-(2-hydroxy-2-methylpropoxy)-2,2,6,6-tetramethylpiperidin-4-yl]-N-butylamino}-6-(2-hydroxyethyl-amino)-s-triazine.

2.8. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.9. Tris-aryl-o-hydroxyphenyl-s-triazines, for example known commercial tris-aryl-o-hydroxyphenyl-s-triazines and triazines as disclosed in, WO 96/28431, EP 434608, EP 941989, GB 2,317,893, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,942,626; 5,959,008; 5,998,116 and 6,013,704, for example 4,6- bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)-phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)-phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite (Ultranox® 626, GE Chemicals, formula (D)), bis(2,6-di-tert-butyl-4-methylphenyl) pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl) 4,4'-biphenylene diphosphonite (Irgafos® P-EPQ, Ciba Specialty Chemicals Corp., formula (H)), 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2] dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3', 5,5'-tetra-tert-butyl-1,1'-biphenyl-2,2'-diyl)phosphite.

For example the following phosphites:

Tris(2,4-di-tert-butylphenyl)phosphite (Irgafos®168, Ciba Specialty Chemicals Corp.), tris(nonylphenyl) phosphite, (A)

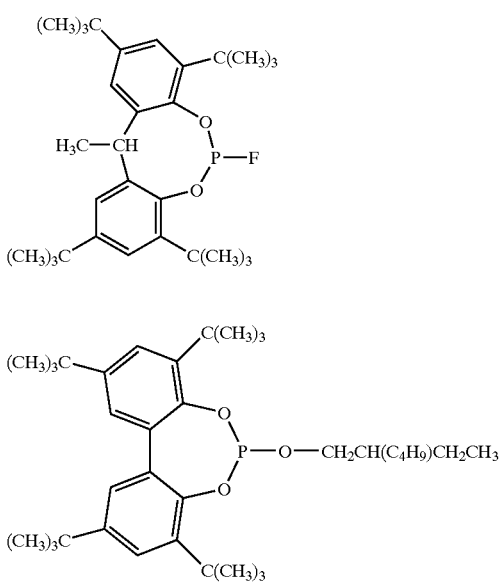

(C)

(B)

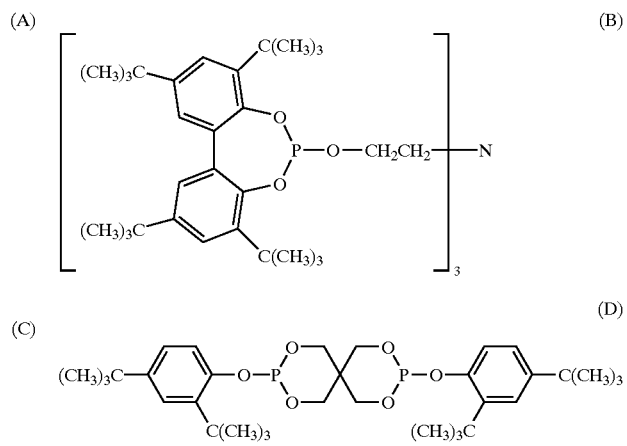

(D)

-continued

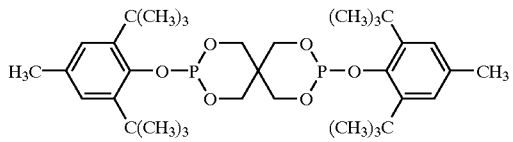 (E)

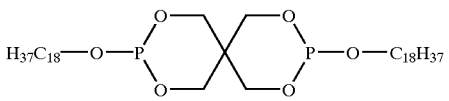 (F)

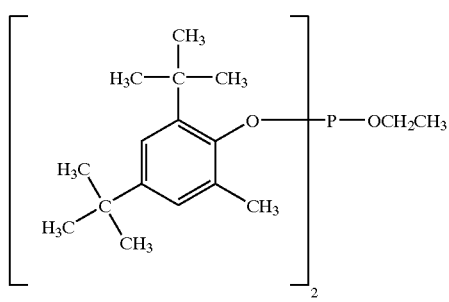 (G)

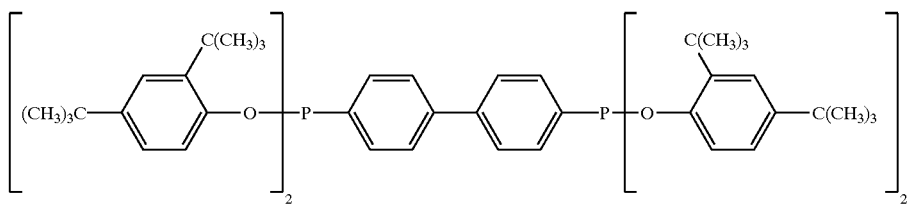 (H)

5. Benzofuranones and indolinones, for example those disclosed in U.S. Pat. Nos. 4,325,863, 4,338,244, 5,175,312, 5,216,052, 5,252,643; DE-A-4316611; DE-A-4316622; DE-A-43116876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, Irganox® HP-136, Ciba Specialty Chemicals Corp., and 3-(2,3-dimethylphenyl)-5,7-di-tert-butyl-benzofuran-2-one.

6. Thiosynergists, for example dilauryl thiodipropionate or distearyl thiodipropionate.

7. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

8. Polyamide stabilizers, for example copper salts in combination with iodides and/or phosphorus compounds and salts of divalent manganese.

9. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances such as talcum, metal oxides such as titanium dioxide or magnesium oxide, phosphates, carbonates or sulfates of, for example, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

11. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Dispersing Agents, such as polyethylene oxide waxes or mineral oil.

13. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifiers such as substituted and unsubstituted bisbenzylidene sorbitols, benzoxazinone UV absorbers such as 2,2'-p-phenylene-bis(3,1-benzoxazin-4-one), Cyasorb® 3638 (CAS#18600-59-4), and blowing agents.

It is also contemplated that the present polyester or polyamide compositions may be further stabilized against the formation of aldehydic contaminants during melt processing with the incorporation therein of poly(vinyl alcohol), ethylene/vinyl alcohol copolymer, polyhydric alcohols, polyacrylamide, polymethacrylamide or an acrylamide or methacrylamide copolymer with at least one ethylenically unsaturated comonomer as disclosed in copending application Ser. Nos. 09/603,505, 09/603,506 and 09/666,679, the relevant parts of which are each hereby incorporated by reference.

Accordingly, the present invention also pertains to a polyester or polyamide composition, stabilized against the formation of aldehydic contaminants during melt processing of said composition, which comprises (a) a polyester or polyamide, and (b) an effective stabilizing amount of at least one compound selected from the group consisting of i.) hydroxylamine stabilizers,
ii.) substituted hydroxylamine stabilizers,
iii.) nitrone stabilizers, and
iv.) amine oxide stabilizers, and optionally (c) an effective stabilizing amount of a polymer which is poly(vinyl alcohol) or an ethylene/vinyl alcohol copolymer, and optionally (d) an effective stabilizing amount of a polyhydric alcohol, and optionally (e) an effective stabilizing amount of a polymer which is polyacrylamide, polymethacrylamide or an acrylamide or methacrylamide copolymer with at least one ethylenically unsaturated comonomer, wherein the polyhydric alcohol is of the formula E-(OH)$_n$ where n is 2 to 4000, and E is a hydrocarbyl moiety.

A hydrocarbyl moiety according to this invention is for example an aliphatic, cycloaliphatic, aromatic or a mono-, di- or poly-saccharride moiety.

The hydrocarbyl moieties for the definition of E may be interrupted by heteroatoms, for example by —O—.

Polyhydric alcohols of component (d) may be for example glycerin, 1,2,3-butanetriol, 1,2,4-butanetriol, erythritol, ribitol, xylitol, dulcitol, sorbitol, 1,2,3-cyclohexatriol, inositol, glucose, galactose, mannose, galacturonic acid, xylose, glucosamine, galactosamine, 1,1,2,2-tetramethyloylcyclohexane, 1,1,1-trimethylolpropane, 1,1,2-trimethyloylpropane, 1,1,1-trimethylolbutane, 1,1,2-trimethylolbutane, 1,1,1-trimethylolpentane, 1,1,2-trimethylolpentane, 1,2,2-trimethylolpentane, trimethylolpentane, pentaerythritol, dipentaerythritol, 1,1,3,3-tetrahydroxypropane, 1,1,5,5-tetrahydroxypentane, 2,2,6,6-tetrakis(hydroxymethyl)cyclohexane and 2,2,6,6-tetrakis(hydroxymethyl)cyclohexanol.

The polyhydric alcohol is for instance starch, cellulose or a sugar or a sugar alcohol.

The polyhydric alcohols include degraded starch (dextrins and cyclodextrins), maltose and its derivatives, maltitol, maltopentaose hydrate, maltoheptaose, maltotetraose, maltulose monohydrate, D,L-glucose, dextrose, sucrose and D-mannitol.

Commercial polyhydric alcohols include trimethylol propane, triethylol propane, glycerol, sorbitol and pentaerythritol.

The polyester or polyamide of component (a) is 95–99.99% by weight and the polymer of component (c) is 5 to 0.01% by weight, based on the total weight of (a) and (c).

For instance, the polyester or polyamide of component (a) is 99.925–99.995% by weight and component (c) is 0.075 to 0.005% by weight based on the total weight of components (a) and (c).

The polyester or polyamide of component (a) is 95–99.99% by weight and the polyhydric alcohol of component (d) is 5 to 0.01% by weight, based on the total weight of (a) and (d).

For instance, component (a) is 98–99.99% by weight and component (d) is 2 to 0.01% by weight of the total weight of (a) and (d); for instance component (a) is 99 to 99.97% by weight and component (d) is 1 to 0.03% by weight of the total weight of (a) and (d).

The polyester or polyamide of component (a) is 95–99.99% by weight and the polymer of component (e) is 5 to 0.01% by weight, based on the total weight of (a) and (e).

It is contemplated that the stabilizers of the present invention, and optional stabilizers may be sprayed onto the polyester or polyamide prior to extrusion, via aqueous or organic suspensions/solutions. Ionic compounds may be employed as additional optional co-additives according to the present invention, for example as further components of aqueous spray solutions applied to PET pellets at higher temperatures. Ionic compounds are for example salts such as sodium hydroxide, sodium carbonate, sodium chloride, disodium tetephthalate, sodium benzoate, ammonium carbonate, potassium carbonate, and the like.

It has been discovered that certain pigments and/or dyes or other colorants, in the compositions of this invention, prevent yellowing of the stabilized polyester and polyamide compositions.

Accordingly, the present invention also pertains to a composition, stabilized against the formation of aldehydic contaminants and against yellowing during melt processing of said composition, which comprises (a) a polyester or polyamide, and
(b) an effective stabilizing amount of at least one compound selected from the group consisting of
i.) hydroxylamine stabilizers,
ii.) substituted hydroxylamine stabilizers,
iii.) nitrone stabilizers, and
iv.) amine oxide stabilizers, and
one or more colorants selected from the group consisting of pigments and dyes.

Suitable pigments or dyes are organic or inorganic. For example cobalt salts, ultramarine blue, polymer soluble blue dyestuffs, and copper phthalocyanine blue are suitable. Cobalt salts are for example cobalt aluminate, cobalt acetate, cobalt stearate and cobalt octoate. Suitable pigments are for example red, blue or violet organic pigments. For example, organic pigments of the Diketo pyrrolo pyrrole, quinacridone, azo condensation, anthraquinone, perinone, chrome complex, benzimidazolone, aminoanthraquinone, napthol, indanthrone, carbazole dioxazine and perylene classes are suitable. Suitable pigments and dyes include Ciba Cromophtal™ Violet B and Violet GT (of the dioxazine class), Pigment Violet 23 and 37, Disperse Violet 57, Solvent Violet 13, Ciba Oracet™ Violet TR, Ciba Oracet™ Violet B, and Bayer Macrolex™ Violet B Gran (of the anthraquinone dye class), PV-19, Cromophtal Violet R RT-891-D, Cromophtal Red 2020, Monastral Red Y RT-759, Monastral Red B RT-790-D, PR-202, Monastral Magenta RT-235-D, and Monastral Red B RT195-D all of the quinacridone pigment class. SV-46, Filamid Violet RB (1:2 chrome complex dyes), and SB-132, Filamid Blue R (anthraquinone) are also suitable. Additional colorants include, PR-177, Cromophtal Red A3B (anthraquinone), PR-264, Irgazin DPP Rubine TR (diketo pyrrolo pyrrole), SR-135, Oracet Red G (perinone), PB 15:3, Cromophtal™ Blue 4GNP, Cromophtal Blue LGLD, PB 15:1, Irgalite Blue BSP, PB-60, Cromophtal Blue A3R (indanthrone), SB-67, and Ciba Oracet™ Blue G.

The following examples are for illustrative purposes only and are not to be construed to limit the scope of the instant invention in any manner whatsoever.

General—PET bottle grade pellets are subjected to extrusion compounding to simulate the heat history which PET experiences when thermally injection molded into bottle preforms and subsequently stretch-blow molded into bottles. The efficacy of an additive added to reduce the formation of acetaldehyde is determined by quantitative analysis using thermal desorption GC-MS or GC-FID after adoption of published methods. An unstabilized PET is extruded each day to provide a control polymer for measuring acetaldehyde formation.

Extrusion—PET is pre-dried in vacuo under nitrogen at an oven temperature of about 70° C. to a moisture level of about 30 ppm which is verified on a Mitsubishi VA-O6 moisturemeter. A Leistritz 18 mm or 27 mm co-rotating, non-intermeshing twin screw extruder is configured as follows: set temps=throat (220–230° C.), zones and die (270° C.), actual extrudate melt temperature is 275–280° C., screw at 100–110 rpm, hopper feeder=10–15 ppm.

PET Pellet Color—Yellowness Index (YI), and L*, a*, b* by ASTM D1925, D65 10 degm specular included, measured on PET pellets using a DCI spectrophotometer.

Acetaldehyde Analysis—The concentration of acetaldehyde in PET is quantitatively determined using a thermal desorption GC-MS method adapted from B. Nijassen et al., Packaging Technology and Science, 9, 175 (1996); S. Yong Lee, SPE ANTEC 1997, pp 857–861; and M. Dong et al., J. Chromatographic Science, 18, 242 (1980). A general example follows below:

The PET samples are analyzed, in duplicate, by weighing 250 mg of powdered PET pellets (cryogenically pulverized) in a 5 mL crimp sealed headspace vial. The sample vial is heated at 120° C. for one hour in a Tekmar model 5000 static headspace analyzer. The headspace gas (5 cc) is then transferred via a heated transfer line to a Fisons MD-800 GC-MS system for SIR detection of the acetaldehyde. The acetaldehyde is detected by monitoring its fragment ions of 29 and 44 m/e. The Total Ion Current (TIC) of the GC-MS is also monitored in the retention time region of 4–8 minutes. By doing this the presence of acetaldehyde in the samples is confirmed by three different detectors. Alternatively, a GC equipped with a flame ionization detector (FID) is used in place of the GC-MS system. By using a known acetaldehyde value for PET, the ratio of peak areas for the known PET resin and for the experimental PET resin blends are compared and the amount of acetaldehyde in the experimental blend can be obtained.

EXAMPLE 1

Unstabilized commercial PET (CLEARTUF 7207, Shell) is used as a control PET. When PET is extrusion compounded, a significant reduction in the amount of acetaldehyde (AA) is observed in samples stabilized with additives of the present invention compared to unstabilized PET. The % AA reduction is the amount less compared to the amount of AA in the control, all measured by GC-FID. Results are in the table below. Additive levels are in parts per million (ppm) based on PET.

| Formulation | Additive | Additive Level (ppm) | % AA Reduction | GCFID avg. ppm AA |
|---|---|---|---|---|
| Control | — | none | — | 3.2 |
| A | nitrone | 1500 | 47 | 1.7 |
| B | nitrone | 5000 | 56 | 1.4 |
| C | nitrone | 15000 | 44 | 1.8 |
| D | hydroxylamine-A | 1500 | 53 | 1.5 |
| E | hydroxylamine-A | 5000 | 69 | 1.0 |
| F | hydroxylamine-A | 15000 | 62 | 1.2 |

"Hydroxylamine-A" is N,N-di(hydrogenated tallow)hydroxylamine as prepared in Example 9 of U.S. Pat. No. 4,876,300. "Nitrone" is the corresponding nitrone, that is primarily N-octadecyl-α-heptadecylnitrone.

It is seen that the additives of the present invention provide significant reduction of acetaldehyde versus the control in PET.

EXAMPLE 2

Unstabilized commercial PET (CLEARTUF 7207, Shell, Certificate of Analysis of 1.4 ppm AA as received) is used as a control PET. Upon a single extrusion heat history, the unstabilized PET increases in acetaldehyde (AA) content to an avg. of 3.0 ppm, indicating that PET produces undesirable AA upon heated melt processing. When PET is extrusion compounded, a significant reduction in the amount of acetaldehyde (AA) is observed in samples stabilized with additives of the present invention compared to unstabilized PET. The % AA reduction is the amount less compared to the amount of AA in the control, all measured by GC-FID. Results are in the table below. Additive levels are in parts per million (ppm) based on PET.

| Formulation | Additive | Additive Level (ppm) | % AA Reduction | GCFID avg. ppm AA |
|---|---|---|---|---|
| Control | — | none | — | 3.0 |
| G | nitrone | 500 | 24 | 2.3 |
| H | nitrone | 1500 | 51 | 1.5 |
| I | nitrone | 5000 | 57 | 1.3 |
| J | hydroxylamine-A | 500 | 29 | 2.1 |
| K | hydroxylamine-A | 1500 | 35 | 1.9 |
| L | hydroxylamine-A | 5000 | 64 | 1.1 |
| M | DBHA | 500 | 12 | 2.6 |
| N | DBHA | 1500 | 30 | 2.1 |
| O | DBHA | 5000 | 38 | 1.9 |

"Hydroxylamine-A" is N,N-di(hydrogenated tallow)hydroxylamine as prepared in Example 9 of U.S. Pat. No. 4,876,300. "Nitrone" is the corresponding nitrone, that is primarily N-octadecyl-α-heptadecylnitrone. "DBHA" is a dibenzyl hydroxylamine, Aldrich Chemical Co., 98+%.

It is seen that the additives of the present invention provide significant reduction of acetaldehyde versus the control in PET.

EXAMPLE 3

Unstabilized commercial PET (CLEARTUF 8006, Shell) is used as a control PET. When PET is extrusion compounded, a significant reduction in the amount of acetaldehyde (AA) is observed in samples stabilized with additives of the present invention compared to unstabilized PET. The % AA reduction is the amount less compared to the amount of AA in the control, all measured by GC-FID. Results are in the table below. Additive levels are in parts per million (ppm) based on PET.

| Formulation | Additive | Additive Level (ppm) | % AA Reduction | GCFID avg. ppm AA |
|---|---|---|---|---|
| Control | — | none | — | 4.2 |
| P | hydroxylamine-A | 500 | 30 | 3.0 |
| Q | hydroxylamine-A | 2500 | 63 | 1.6 |
| R | hydroxylamine-B | 500 | 21 | 3.3 |
| S | hydroxylamine-B | 2500 | 63 | 1.6 |
| T | amine oxide | 500 | 32 | 2.9 |
| U | amine oxide | 2500 | 52 | 2.0 |

"Hydroxylamine-A" is N,N-di(hydrogenated tallow)hydroxylamine as prepared in Example 9 of U.S. Pat. No. 4,876,300. "Hydroxylamine-B" is a commercial sample of N,N-di(hydrogenated tallow)hydroxylamine, Irgastab ® FS-042, Ciba Specialty Chemicals Corp., CAS# 143925-92-2. "Amine oxide" is Genox ™ EP, a di($C_{16}$–$C_{18}$)alkyl methyl amine oxide, CAS# 204933-93-7, GE Chemicals.

It is seen that the additives of the present invention provide significant reduction of acetaldehyde versus the control in PET.

EXAMPLE 4

Unstabilized commercial PET (CLEARTUF 8006, Shell) is used as a control PET. When PET is extrusion compounded, a significant reduction in the amount of acetaldehyde (AA) is observed in samples stabilized with an additive of the present invention compared to unstabilized PET. The % AA reduction is the amount less compared to the amount of AA in the control, all measured by GC-FID.

| Formulation | Additive | Additive Level (ppm) | % AA Reduction | GCFID avg. ppm AA |
|---|---|---|---|---|
| Control | — | none | — | 3.2 |
| V | acetoxyamine | 1500 | 30 | 2.2 |
| W | acetoxyamine | 5000 | 61 | 1.2 |

Acetoxyamine is N,N-di(hydrogenated tallow)acetoxyamine prepared from hydroxylamine-A of Example 1 and acetic anhydride.

It is seen that the acetoxyamine of the present invention provides significant reduction of acetaldehyde versus the control in PET.

EXAMPLE 5

A base PET resin is prepared by extrusion compounding hydroxylamine-B (N,N-di(hydrogenated tallow) hydroxylamine, Irgastab® FS-042, Ciba Specialty Chemicals Corp.) at 0.25 wt % into PET. The base resin is redried, and the formulations of the table below are prepared by extrusion compounding PET color concentrates with the PET base resin. The formulated products are redried and injection molded into 60 mil plaques and color data is obtained on a DCI Colorimeter in transmission mode. Comparison of the color value for the PET base resin containing 0.25% FS-042 (b* value=10.83) with the colored formulations indicates that yellowing is significantly prevented in the present compositions stabilized against acetaldehyde formation. Oracet Violet TR (dye) is of the anthraquinone class. Cromophtal Blue 4GNP (pigment) is of the phthalocyanine class.

| Formulation | Colorant | Colorant Level (ppm) | L* | a* | b* | corrected YI |
|---|---|---|---|---|---|---|
| Control | — | — | 93.9 | −1.51 | 10.83 | 14.4 |
| 75 | Violet TR | 1 | 94.7 | −1.30 | 7.02 | 8.74 |
| 76 | Violet TR | 2 | 94.2 | −1.30 | 6.90 | 8.59 |
| 77 | Violet TR | 4 | 93.3 | −1.26 | 6.03 | 7.23 |
| 78 | Violet TR | 5 | 92.0 | −1.75 | 6.81 | 8.31 |
| 79 | Violet TR | 10 | 91.5 | −1.56 | 4.14 | 3.86 |
| 80 | blue 4GNP | 1 | 94.1 | −2.91 | 6.55 | 6.78 |
| 81 | blue 4GNP | 5 | 91.7 | −1.65 | 5.47 | 6.09 |
| 82 | blue 4GNP | 10 | 92.9 | −7.14 | 5.45 | 1.80 |
| 83 | Violet TR/ blue 4GNP | 1/1 | 94.4 | −1.90 | 6.84 | 8.01 |

EXAMPLE 6

Polyamide 4; 6,6; 6; 12; and 6,4 molded articles, fibers and films and PET fibers and films, are prepared by melt extrusion with additives as in Examples 1–5. Significant reduction in aldehydic contaminants is observed.

EXAMPLE 7

Examples 1–6 are repeated with the further inclusion of dipentaerythritol in the inventive formulations. Excellent results are achieved.

What is claimed is:

1. A mono- or multi-layered plastic container or film, stabilized against the formation of aldehydic contaminants during melt processing of said container or film, comprising at least one layer which comprises
   an extrusion blend comprising
   (a) a polyester or polyamide, and
   (b) an effective stabilizing amount of N,N-di(alkyl) hydroxylamine produced by the direct oxidation of N,N-di(hydrogenated tallow)amine
   wherein in the polyester
   the dicarboxylic acid repeat units are selected from the group consisting of terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, glutaric acid, adipic acid, sebacic acid and mixtures thereof; and
   the diol portion is derived from the group consisting of ethylene glycol, diethylene glycol, triethylene glycol, propane-1,3-diol, butane-1,4-diol, pentane-1,5-diol, hexane-1,6-diol, 1,4-cyclohexanedimethanol, 3-methylpentane-2,4-diol, 2-methylpentane1,4-diol, 2,2-diethyl-propane-1,3-diol, 1,4-di-(hydroxyethoxy) benzene, 2,2-bis(4-hydroxycyclohexyl)-propane, 2,4-dihydroxy-1,1,3,3-tetramethylcyclobutane, 2,2-bis-(3-hydroxyethoxyphenyl)propane, 2,2-bis-(4-hydroxypropoxyphenyl)ethane and mixtures thereof.

2. A plastic container according to claim 1 which is a rigid bottle.

3. A container or film according to claim 1 wherein component (a) is 95–99.99% by weight and the stabilizers of component (b), in total, are 5 to 0.01% by weight, based on the total weight of (a) and (b).

4. A container or film according to claim 1 wherein component (a) is 98–99.99% by weight and component (b) is 2 to 0.01% by weight, based on the total weight of (a) and (b).

5. A container or film according to claim 1 wherein component (a) is 99–99.97% by weight and component (b) is 1 to 0.03% by weight, based on the total weight of (a) and (b).

6. A container or film according to claim 1 where component (a) is poly(ethylene terephthalate) or poly(ethylene 2,6-naphthalene-2,6-dicarboxylate).

7. A container or film according to claim 1 where component (a) is a polyamide.

8. A container or film according to claim 1 where component (a) is poly(ethylene terephthalate).

9. A container or film according to claim 1 further comprising (c) an effective stabilizing amount of poly(vinyl alcohol) or an ethylene/vinyl alcohol copolymer.

10. A container or film according to claim 1 further comprising (d) an effective stabilizing amount of a polyhydric alcohol of the formula E—(OH)$_n$
    where
    n is 2 to 4000, and
    E is a hydrocarbyl moiety.

11. A container or film according to claim 1 further comprising (e) an effective stabilizing amount of a polymer which is polyacrylamide, polymethacrylamide or an acrylamide or methacrylamide copolymer with at least one ethylenically unsaturated comonomer.

12. A container or film according to claim 1 further comprising trimethylolpentane, pentaerythritol or dipentaerythritol.

13. A container or film according to claim 1 further comprising one or more colorants selected from the group consisting of pigments and dyes.

* * * * *